(12) United States Patent
Khandekar et al.

(10) Patent No.: US 6,385,703 B1
(45) Date of Patent: May 7, 2002

(54) SPECULATIVE REQUEST POINTER ADVANCE FOR FAST BACK-TO-BACK READS

(75) Inventors: Narendra S. Khandekar, Folsom; David D. Lent, Placerville; Zohar Bogin, Folsom, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/205,647

(22) Filed: Dec. 3, 1998

(51) Int. Cl.[7] .................................................. G06F 13/14
(52) U.S. Cl. ....................... 711/146; 711/143; 711/204; 711/213
(58) Field of Search ................................. 711/137, 143, 711/146, 204, 213

(56) References Cited

U.S. PATENT DOCUMENTS

| | | | | |
|---|---|---|---|---|
| 5,072,369 A | * | 12/1991 | Theus et al. ................ | 711/146 |
| 5,325,503 A | * | 6/1994 | Stevens et al. .............. | 711/146 |
| 5,335,335 A | * | 8/1994 | Jackson et al. .............. | 711/121 |
| 5,341,487 A | * | 8/1994 | Derwin et al. ............... | 711/146 |
| 5,353,415 A | * | 10/1994 | Wolford et al. .............. | 711/146 |
| 5,355,467 A | * | 10/1994 | MacWilliams et al. ...... | 711/146 |
| 5,379,384 A | * | 1/1995 | Solomon ...................... | 395/325 |
| 5,420,991 A | * | 5/1995 | Konigsfeld et al. .......... | 395/375 |
| 5,499,355 A | * | 3/1996 | Krishnamohan et al. ..... | 711/137 |
| 5,630,094 A | * | 5/1997 | Hayek et al. ................. | 711/146 |
| 5,765,208 A | * | 6/1998 | Nelson et al. ................ | 711/204 |
| 5,802,576 A | * | 9/1998 | Tzent et al. .................. | 711/146 |
| 6,055,608 A | * | 4/2000 | Arimilli et al. .............. | 711/146 |

OTHER PUBLICATIONS

INTEL Pentium Processor User's Manual, vol. 1: Pentium Processor Data Book, 1994, pp 1–9 and 6–11 to 6–12.*

* cited by examiner

*Primary Examiner*—Reba I. Elmore
(74) *Attorney, Agent, or Firm*—Blakely, Sokoloff, Taylor & Zafman LLP

(57) ABSTRACT

A computer system that includes a host processor (HP), a system memory (SM), and a host bridge coupled to the HP and SM is provided. The host bridge asserts a first read request to the SM and, prior to availability of snoop results in connection with the first read request, the host bridge asserts a following second read request to the SM.

22 Claims, 3 Drawing Sheets

SPECULATIVE REQUEST POINTER ADVANCE FOR FAST BACK-TO-BACK READS

BACKGROUND OF THE INVENTION (1) Field of the Invention

The present invention relates to the field of computer systems. More specifically, the present invention relates to chipsets in computer systems.

(2) Background Information

A typical computer system includes a host processor coupled to a chipset (hereinafter referred to as "host bridge"). The host bridge may be coupled to an input/output bus such as a Peripheral Component Interconnect (PCI) bus. The host bridge may include a memory controller that is coupled to a system memory. The host bridge serves as an interface between the host processor, the system memory, and the PCI bus.

During a typical read cycle, the processor provides the cycle type and address during the address phase. The address is compared with cache line tags and the result of this comparison is presented on a host bus during the snoop phase. The cache is a high speed memory that contains duplications of most recently used data in the system memory. Many times there is a discrepancy between the cache and the system memory in that the cache has more up-to-date data than the system memory. For any operation that requires access to a cacheable range in the system memory, the host bridge has to check, prior to accessing the actual contents of the system memory, to see if an entry in the cache, that has a tag corresponding to an entry in the system memory, has been modified in any way. If the entry has been modified, the content of the system memory is stale. The respective entry in the cache is extracted and is flushed to the system memory. This whole operation is called "snooping".

Back-to-back read operations are read operations generated by the CPU at the fastest possible rate. One example of back-to-back reads operation is an operation where the address strobe (ADS#) signal is asserted every three clocks. To process back-to-back read operations to the system memory, the host bridge asserts a request to the system memory for the initial read. After the host bridge asserts a request to the system memory for the initial read, the host bridge waits to sample the result during the snoop phase. If the line in the cache, corresponding to the memory location accessed, is not modified, the host bridge asserts a request to the system memory for a subsequent read. If the line in the cache has been modified, the host bridge first flushes the modified line from the cache to the system memory and then initiates the subsequent read. This creates a critical path from the sampling of the snoop results on the host bus, to the incrementing of a read request pointer that points to the subsequent location in the memory to be read out, to the assertion of the read request to the system memory. At high frequencies, at which current host bridges operate, this critical path, when the line to be read out has been modified in the cache, prevents the assertion of a timely request to the system memory for the subsequent read in the case of back-to-back read operations.

It is desirable to provide a method and an apparatus where fast back-to-back reads are not substantially affected in time by the snoop operation if a line desired to be read out has been modified in the cache.

SUMMARY OF THE INVENTION

Briefly an embodiment of the present invention provides a computer system that includes a host processor (HP), a system memory (SM), and a host bridge coupled to the HP and SM. The host bridge asserts a first read request to the SM and, prior to availability of snoop results in connection with the first read request, the host bridge asserts a following second read request to the SM.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

One embodiment of the present invention provides a computer system that includes a host processor (HP), a system memory (SM), and a host bridge coupled to the HP and SM. The host bridge asserts a first read request to the SM and, prior to availability of snoop results in connection with the first read request, the host bridge asserts a following second read request to the SM. This is advantageous as time is gained by not having to wait for the snoop results in connection with the first read request, but rather proceeding to assert the second request, and so on. The host bridge is configured to abort the second read request in the event of a write-back. In the event that the snoop results indicate that the first access is to a modified cache line, in a cache of the host processor, the host bridge is configured to abort the second read request and flush data from the cache to the system memory. Since write-backs are infrequent, the gain realized by the host bridge by asserting a following second read request to the system memory prior to the availability of snoop results in connection with the first read request more than offsets the loss of a clock for the write-backs.

Figure 1:
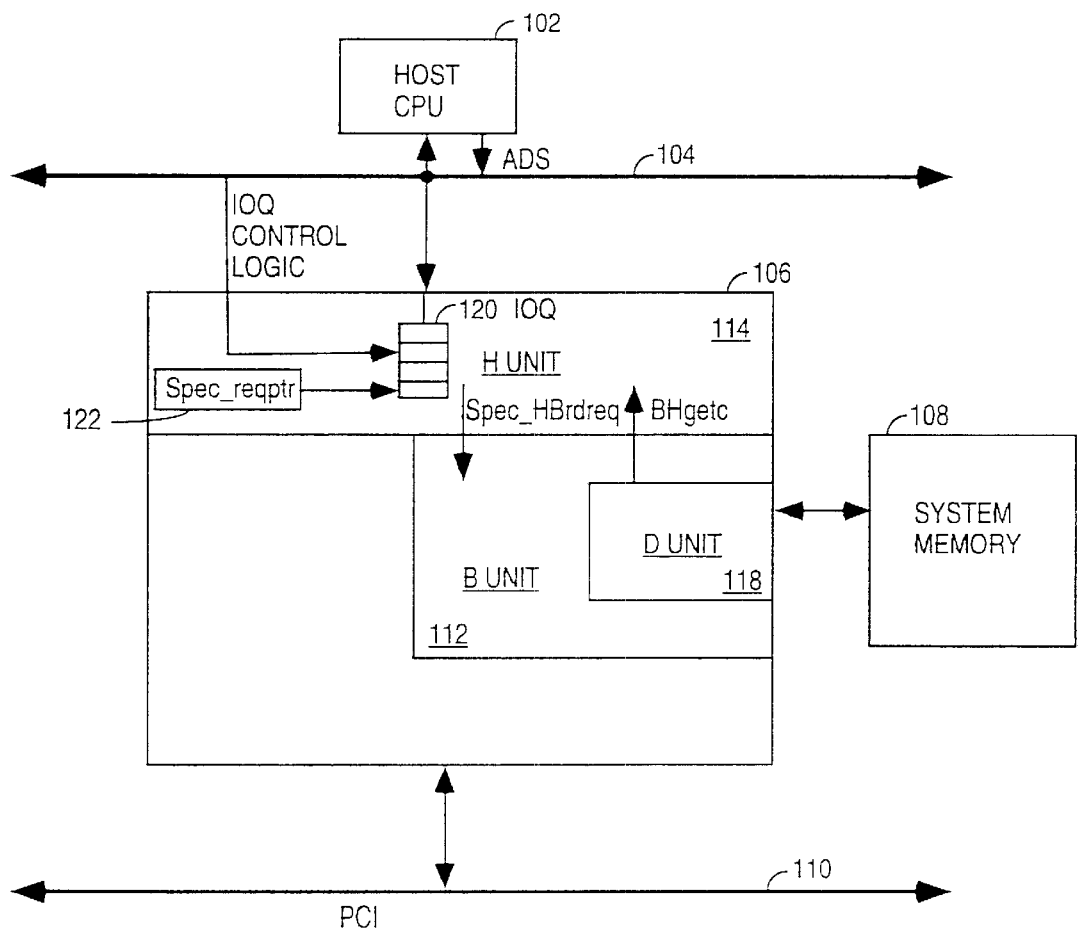
FIG. 1 illustrates a computer system according to an embodiment of the present invention.

FIG. 1 illustrates a computer system 100 according to one embodiment of the invention. Computer system 100 includes a host Central Processing Unit (CPU) 102 coupled to host bus 104. Host CPU 102 is also coupled to a host bridge 106. The host bridge 106 is coupled to a system memory 108 and to an input/output bus 110. In one embodiment of the invention described herein, the input/output bus 110 is a Peripheral Component Interconnect (PCI) bus.

Host bridge 106 includes a plurality of units that perform different functions. The host units includes host interface unit (H-unit) 114, that interfaces with host bus 104 and, therefore, with host agents such as host CPU 102. Other host agents may be coupled to host bus 104. Host bridge 106 also includes a bridge interface unit (B unit) 112 that controls the interaction between various devices including host CPU 102 and system memory 108. The host bridge 106 further includes a system memory interface unit (D unit) 118. In one embodiment of the present invention described herein, the system memory 108 includes a dynamic random access memory (DRAM) device and the system memory unit interface 118 includes a DRAM interface unit. The DRAM interface unit 118 may also dock other devices to the system memory 108.

The H-unit 114 includes an in-order queue 120 that stores addresses in connection with current operations. In one embodiment of the present invention, a speculative request pointer 122 points to a location in the queue where a current address, in connection with the current memory operation to be performed, resides. For example, the speculative request pointer 122 points to a location storing an address, in system memory 108, in connection with which a read operation may be performed.

Typically, when host CPU 102 initiates a read cycle, an address strobe signal (ADS#) is asserted by CPU 102 to host bridge 106. The address for the cycle is then decoded by the H Unit 114 and a determination is made as to which device the cycle is going to. In this case, the read cycle is going to memory 108 and therefore, H-unit 114 asserts a request, Spec_HBrdreq, to the B-unit 112 to indicate that it has a request pending to memory 108. A second read request Spec_HBrdreq is asserted, prior to availability of snoop results in connection with the first read request. By asserting the second read request earlier, the computer system according to one embodiment of the present invention provides improved speed at which data is returned to the host bus that speeds up CPU performance as data is returned earlier than would otherwise happen with conventional read mechanisms.

Figure 2:
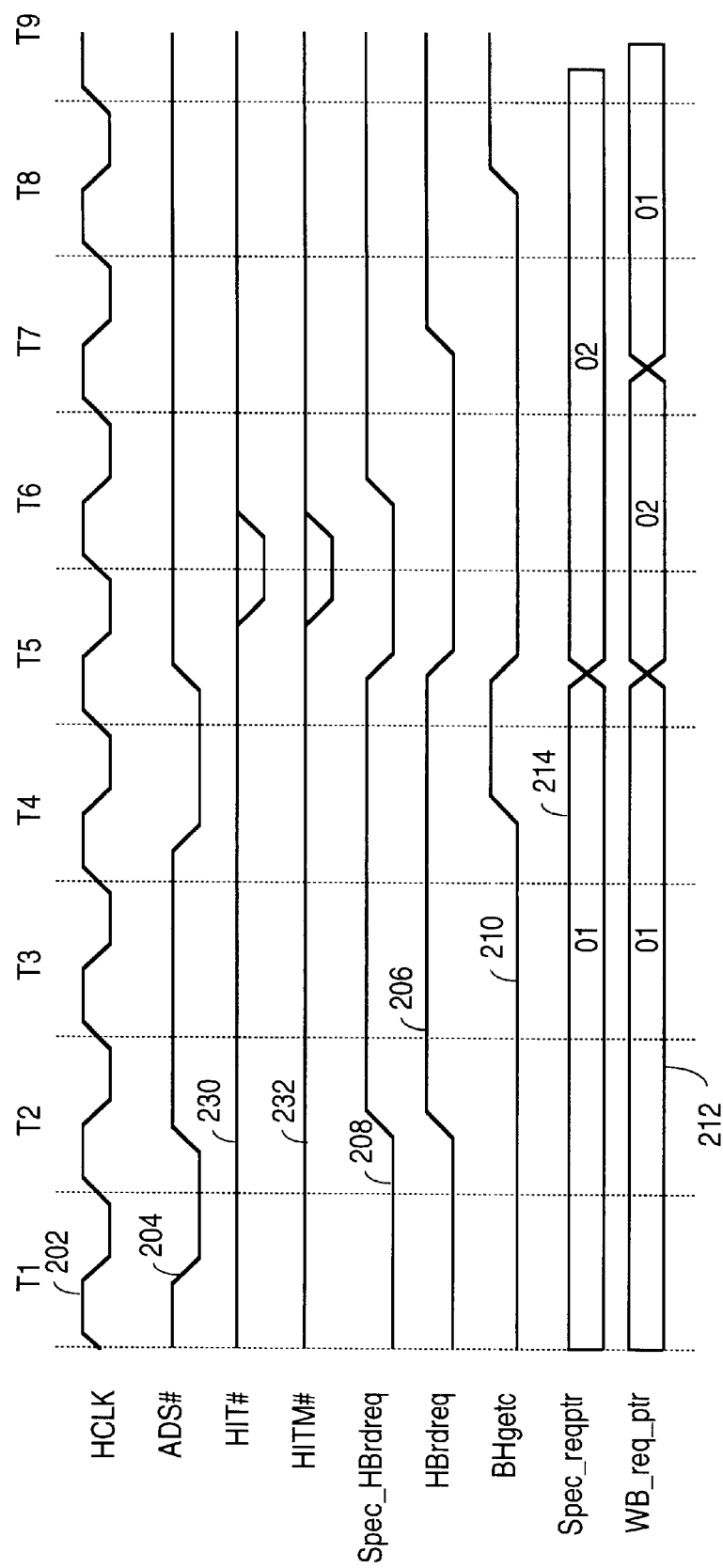
FIG. 2 illustrates a timing diagram in connection with signals associated with a back-to-back read operation in a computer system according to an embodiment of the present invention.

FIG. 2 illustrates a timing diagram in connection with signals associated with a back-to-back read operation in a computer system according to an embodiment of the present invention. A signal HCLK 202 represents the system clock signal. FIG. 2 also illustrates the address strobe signal (ADS#) 204. ADS# is a signal asserted by the host CPU 102 to the host bus to indicate that an address has been provided by the host CPU 102 to the host bridge 106 and that address is valid. When a back-to-back read is performed to the system memory 108, successive ADS# signals asserted by the host processor are separated by a shortest possible amount of time. In one embodiment according to the present invention, successive ADS# signals 204 are three clocks apart. Once ADS# 204 is asserted, the address that comes along with ADS# 204 is decoded and it is determined whether the read operation is going to be to the system memory. If this is the case, the H-unit 114 asserts a speculative read request (Spec_HBrdreq) signal 208 to B-unit 112 indicating that there is a cycle pending to system memory 108. The Spec_HBrdreq signal 208 is asserted in clock cycle $T_2$.

Assume that there are multiple CPUs coupled to the host bus 102. If a read is initiated by a first CPU, the second CPU looks at the first ADS# and tries to determine if that data is in a modified state in its own cache. The second CPU provides information regarding the state of its cache in clock cycle $T_5$. This information is provided in the form of assertion of the HIT# 230 or HITM# 232 signals. The asserted HIT# signal indicates that there was a "hit" to the cache, while the asserted HITM# signal indicates that there was a "hit" to a modified line in the cache. In case there is a modified line in the cache, a signal HITM# is asserted in $T_5$.

For back-to-back reads, the second assertion of ADS# occurs in $T_4$. Even though the second ADS# is asserted in $T_4$, the address information from that ADS# is only available in $T_5$. While the HITM# signal is asserted on the host bus in $T_5$, the snoop results are available in $T_6$ to the host bridge 106. A signal BHgetC 210 indicates that the B-unit has accepted the first read request such that the H-unit knows that it is done with the previous read cycle in $T_5$ and therefore it could go ahead and speculatively assert the next read request (Spec_HBrdreq) in $T_6$.

If a read operation was directed to data in a modified line, a write back to memory would be required. Moreover, since the second read could be to the same address, and the first read may have caused the line to be modified, one would need to first write data from the first read operation to the system memory before one may initiate the second read operation. In the absence of the read mechanism according to one embodiment of the present invention, the next HBrdreq 206 for the second access would be asserted in $T_7$, as the results of the snoop would be available in $T_6$. HBrdreq 206 is the read request signal asserted by H-unit to B-unit in the absence of the host bridge implementing the speculative read request signal Spec_HBrdreq. Because in the computer system according to one embodiment of the present invention the speculative read request signal Spec_HBrdreq 208 is asserted earlier, at $T_6$ instead of $T_7$, a one-clock gain is produced with respect to back-to-back read operations.

FIG. 2 also illustrates a speculative request pointer (Spec_reqptr) 214. The speculative request pointer 214 is a pointer to the in-order queue described in FIG. 1. The Spec_Reqptr 214 points to a current address from where data is to be read out. Once signal BHgetC 210 is asserted, the speculative request pointer 214 points to a location in the queue that stores the next address from where data is to be read out. The Spec_Reqptr 214 is incremented to point to the next address even though the snoop results of the previous read operation have not been decoded yet. Once the B-unit has accepted the previous read request by assertion of signal BHgetC 210 in $T_4$, the Spec_Reqptr 214 is incremented in $T_5$ without waiting for the decoded snoop results available in $T_6$. If a hit to a modified line is asserted, a write back is performed. Then the speculative request pointer is decremented to go back to the previous address that is the correct address for write back. In this case, an extra clock penalty is incurred. However, the percentage of times when one actually performs a write back is much lower than the times where there is no write back. Therefore, the scheme of the present invention where the speculative request pointer is speculatively incremented ahead of availability of the snoop results, provides considerable performance improvement.

FIG. 2 also illustrates the signal write back request pointer WB_Reqptr 212 that is the speculative request pointer in the event of a write back. Signal 212 is asserted at $T_5$ to point to the next address from where a read operation is to be performed. However, as the results of the snoop operations are available at $T_6$ and a line was modified in the cache, the WB_Reqptr 212 is decremented to point to the previous address so that the write back operation may be performed to the previous address.

Figure 3:
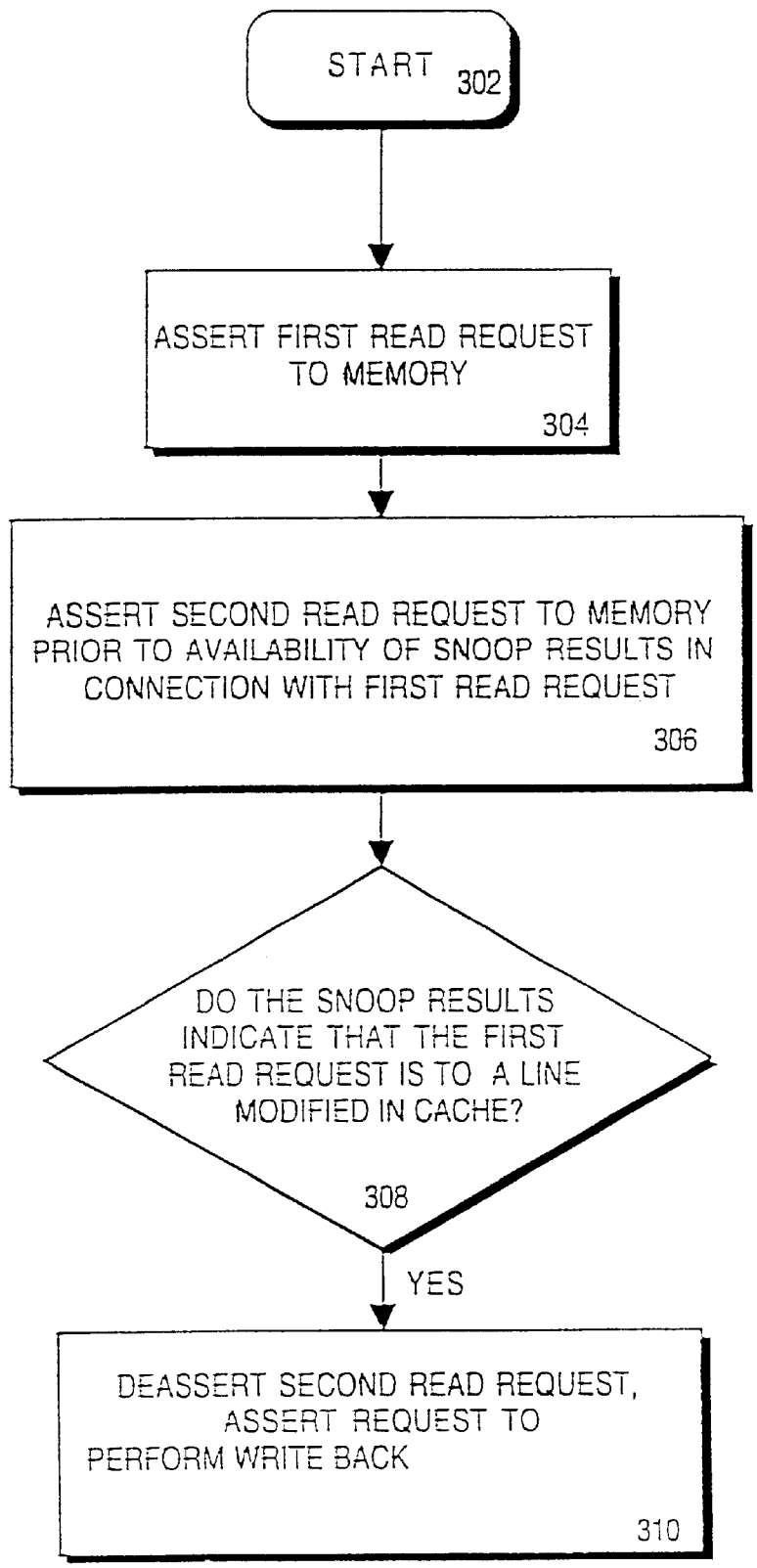
FIG. 3 illustrates a flow chart diagram in connection with a method of performing back-to-back reads according to an embodiment of the present invention.

FIG. 3 illustrates a flow chart diagram in connection with a process of performing back-to-back reads according to one embodiment of the present invention. The process starts at block 302 from where it flows to block 304. At block 304, the first read request is asserted to a memory. The process then passes to block 306 where a second read request is asserted to the memory, prior to availability of snoop results in connection with the first read request. The method then passes to decision block 308 where it is determined whether the snoop results indicated that the first read request is to a line modified in a cache. If so, the process goes to block 310 where the second read request is deasserted and a request to perform a write back is asserted.

In the above description, numerous specific details are set forth to provide a thorough understanding of the present invention. However, one having ordinary skill in the art should recognize that the invention may be practiced without these specific details. In some instances, well-known elements, structures, and techniques have not been shown in detail to avoid obscuring the present invention.

What is claimed is:

1. A computer system that includes a host processor (HP) and a system memory (SM), the computer system comprising:
   a host bridge, coupled to said HP and SM, to assert a first read request to said SM and, prior to availability of snoop results in connection with said first read request, to assert a following second read request to said SM.

2. The computer system of claim 1, said host bridge configured to abort said second read request in response to detecting a need for write back.

3. The computer system of claim 2, said host bridge further configured to flush data for said first read request, from a snooped cache, to said SM in the event of the write-back.

4. The computer system of claim 3, said host bridge further configured to assert said following second read request after flush of data from the cache snooped.

5. The computer system of claim 1, said host bridge including a queue to store addresses for memory operations.

6. The computer system of claim 5, said host bridge including a speculative request pointer to point to a next address in the queue prior to availability of snoop results in connection with a previous read operation.

7. The computer system of claim 6, said speculative request pointer incremented after said first read request was accepted.

8. The computer system of claim 1, said host processor asserting address strobe (ADS#) signals every 3 clock cycles.

9. The computer system of claim 1, a read operation to the memory is requested in a clock cycle following assertion of an ADS# signal.

10. In a computer system process for providing back-to-back reads to a memory, the process comprising:
    asserting a first read request to said memory;
    asserting a second read request to said memory prior to availability of snoop results in connection with said first read request.

11. The process of claim 10, further including deasserting said second read request and asserting a request to perform a write-back if the snoop results indicate that the first read request is to a line modified in cache.

12. The computer system of claim 1 wherein the host bridge is to assert the first read request to service a request from the host processor to read from the system memory.

13. A chipset comprising:
    a host bridge to be coupled to a host processor and system memory, to perform back to back read operations to the system memory by asserting a first read request to the system memory, performing a snoop operation in connection with the first read request, and, prior to the availability of the snoop results, asserting a following second read request to the system memory.

14. The chipset of claim 13 wherein the host bridge is configured to assert the first read request to the system memory to service back-to-back reads for the host processor.

15. The chipset of claim 13 wherein the host bridge is to abort the second read request in response to a write-back being needed, as revealed by the snoop result.

16. The chipset of claim 15 wherein the host bridge is to further flush data for the first read request from a cache that has been snooped to the system memory in the event of the write-back.

17. The chipset of claim 16 wherein the host bridge is to further assert the following second read request after data from the cache has been flushed.

18. The chipset of claim 13 wherein the host bridge includes a queue to store addresses for memory operations.

19. The chipset of claim 18 wherein the host bridge includes a speculative request pointer to point to a next address in the queue prior to the availability of snoop results in connection with a previous read operation.

20. The chipset of claim 19 wherein the speculative request pointer is to be incremented after said first request has been accepted.

21. The chipset of claim 13 wherein the host bridge has an address strobe input to be coupled to the host processor, and wherein an address strobe signal is asserted at the input every three clock cycles for the back-to-back read operations.

22. The chipset of claim 21 wherein the host bridge is to receive a request for a read operation to the memory in a clock cycle following the assertion of the address strobe signal.

* * * * *